United States Patent

Kopetzky et al.

[11] Patent Number: 5,743,480
[45] Date of Patent: Apr. 28, 1998

[54] SAFETY BELT ARRANGEMENT IN MOTOR VEHICLES HAVING A BELT TENSIONER

[75] Inventors: Robert Kopetzky, Lonsee; Robert Wittmann, Neu-Ulm; Georg Bannert, Ummendorf; Martin Wifling, Blaustein; Thomas Kempfle, Bibertal-Schneckenhofen; Ulrich Diepold, Ulm; Andreas Wengert, Mutlangen; Christian Husung, Heuchlingen, all of Germany

[73] Assignee: Takata (Europe) Vehicle Safety Technology GmbH, Germany

[21] Appl. No.: 594,579

[22] Filed: Jan. 31, 1996

[30] Foreign Application Priority Data

Feb. 1, 1995 [DE] Germany .................. 195 03 150.4

[51] Int. Cl.$^6$ .................................................. B60R 22/46
[52] U.S. Cl. .................................................. 242/374
[58] Field of Search .................... 242/374; 280/806, 280/807; 297/478, 480

[56] References Cited

U.S. PATENT DOCUMENTS

| | | | |
|---|---|---|---|
| 4,423,846 | 1/1984 | Föhl et al. | 242/374 |
| 5,489,072 | 2/1996 | Gordon | 242/374 |
| 5,526,996 | 6/1996 | Ebner et al. | 242/374 |

FOREIGN PATENT DOCUMENTS

| | | |
|---|---|---|
| 0 093 238 A1 | 11/1983 | European Pat. Off. . |
| 0 093 844 A2 | 11/1983 | European Pat. Off. . |
| 0 321 960 A1 | 6/1989 | European Pat. Off. . |
| 0 361 075 A1 | 4/1990 | European Pat. Off. . |
| 0 470 602 A1 | 2/1992 | European Pat. Off. . |
| 0 581 288 A1 | 2/1994 | European Pat. Off. . |
| 0 600 689 A1 | 6/1994 | European Pat. Off. . |
| 0 638 468 A1 | 2/1995 | European Pat. Off. . |
| 0 703 125 A1 | 3/1996 | European Pat. Off. . |
| 32 15 925 A1 | 11/1983 | Germany . |
| 34 00 177 C2 | 7/1985 | Germany . |
| 36 00 004 A1 | 7/1987 | Germany . |
| 42 27 781 A1 | 2/1994 | Germany . |
| 2 180 734 | 4/1987 | United Kingdom . |
| 2 216 776 | 10/1989 | United Kingdom . |
| 2 268 678 | 1/1994 | United Kingdom . |
| WO 89/06304 | 7/1989 | WIPO . |

*Primary Examiner*—John M. Jillions
*Attorney, Agent, or Firm*—Fitch, Even, Tabin & Flannery

[57] ABSTRACT

The invention relates to a safety belt arrangement in vehicles having a belt tensioner comprising: a holder which is to be secured to the vehicle chassis, with a belt winding reel with a safety belt wound thereon being rotatably mounted on the holder; a belt retraction spring arrangement by means of which the safety belt is continuously lightly pretensioned in the draw-in direction so that it only loosely lies against the vehicle occupant secured by it; and an auxiliary drive which is separated drivewise by a clutch from the belt winding reel but is activated abruptly with an accident-dependent acceleration and is rotationally fixedly coupled to the belt winding reel via the then engaged clutch. The auxiliary drive has two band running chambers separated by sealing walls and two draw bands which are each arranged in one band running chamber, with the draw bands being secured at one end to a housing and at the other end to a drive reel and being acted on by the pressure source in the event of an accident-dependent acceleration of the vehicle in order to drive the drive reel which is fixedly connected to the belt winding reel in the belt draw-in direction. In accordance with the invention, the clutch is accommodated in a hollow coupling cavity provided in the drive reel.

17 Claims, 13 Drawing Sheets

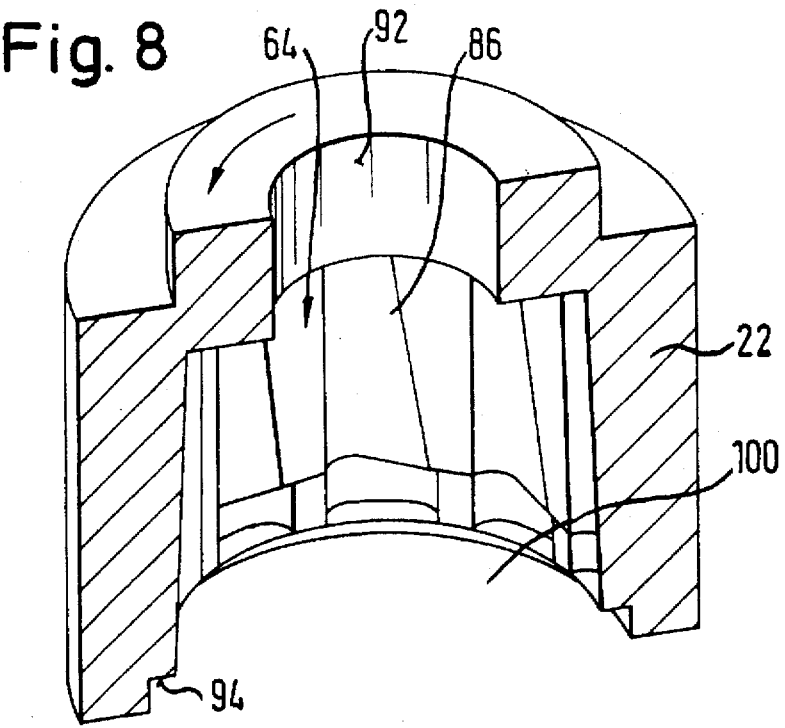
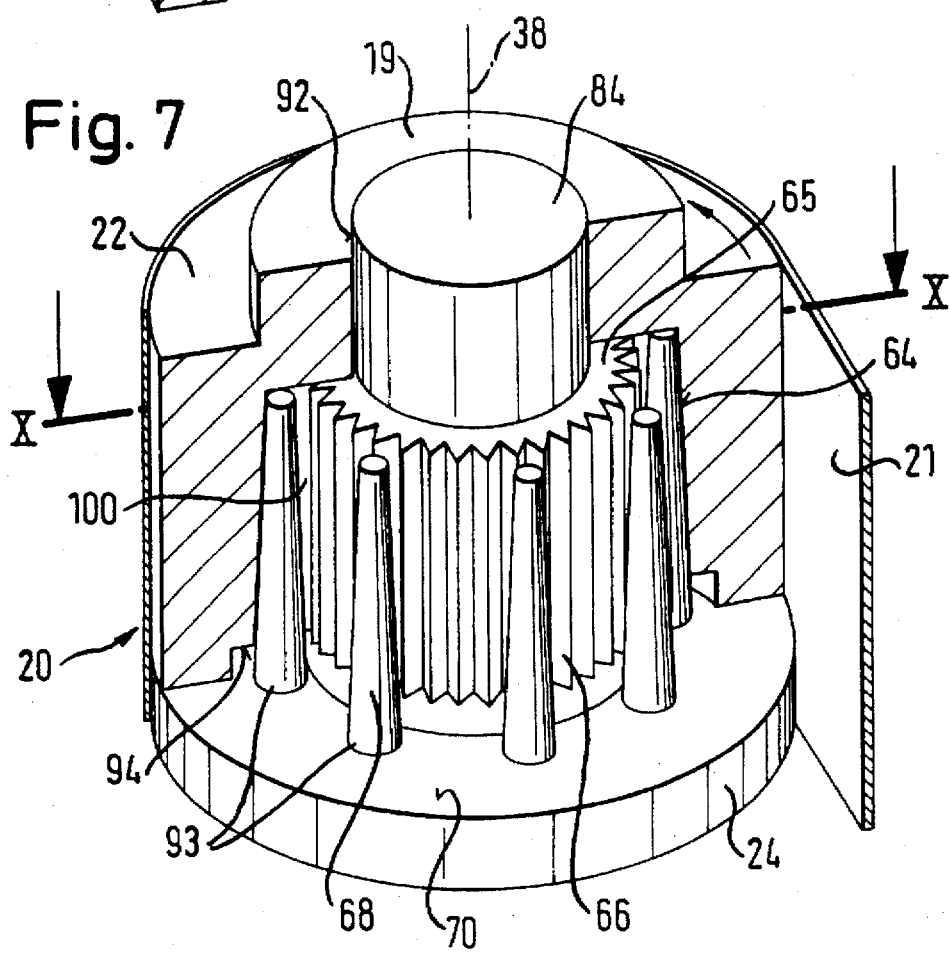

SAFETY BELT ARRANGEMENT IN MOTOR VEHICLES HAVING A BELT TENSIONER

BACKGROUND OF THE INVENTION

The invention relates to a safety belt arrangement in motor vehicles and having a belt tensioner. A belt tensioner for such a safety belt arrangement is already known from FIGS. 9 and 10 of EP-0-581 288 A1. In this arrangement the draw band forms an arc extending substantially over 180° between the peripheral wall of the band running chamber and the circumference of the drive shaft or of the drive reel. This arc is acted on by a pressurized gas at the concave side during an accident-dependent acceleration, whereby, in dependence on the exposed, through-hanging, effective surface of the draw band, a corresponding force is exerted on the band in the peripheral direction. This force generates a corresponding torque at the drive shaft, or at the drive reel on which it is partly wound up, so that the drive shaft, or the drive reel, is correspondingly set into rotation. As a result of a clutch which engages during an accident-dependent acceleration, the torque is transmitted in this way to the belt winding reel in the draw-in direction.

The dimensioning of the individual components should in this arrangement be such that a minimum tensioning length of the belt of 140 mm is achieved. A certain additional draw-in length should, however, still be available so that the belt can be drawn in or tensioned, for example, by a max. of 205 mm, by the belt tensioner.

After this tensioning the pressure which is generally only generated for a short time by the pyrotechnical charge drops off, whereupon the fixing arrangement is released by the drawing out of the belt caused by the vehicle occupant falling into the safety belt and the vehicle occupant is now reliably held by the tensioned belt.

A particularly important aspect of such belt tensioners lies in building up and accommodating the clutch which is necessary between the torque generating device and the drive axle of the belt winding reel, so that it is as space-saving as possible, but nonetheless extremely reliable in operation. An example for such a clutch can be found in DE-A-44 32 593 and is described further below with reference to FIG. 1.

SUMMARY OF THE INVENTION

The object of the present invention thus lies in setting forth further advantageous safety belt arrangements with belt tensioners of the initially named kind. In particular, safety belt arrangements having such a belt tensioner are proposed in which the clutch is space-savingly and operationally reliably accommodated between the torque generating device and the belt winding reel and is also of simple design.

Additionally, one advantage of the invention is that the clutch is accommodated radially inside the drive shaft or the drive reel of the the torque generating device and thus in an extremely space-saving manner. As a result of the design of the invention, extreme operational reliability is ensured at the same time.

In one form, the clutch can be accommodated in a space-saving manner, and simultaneously in a very operationally reliable manner, in the axial direction.

The disclosure content of DE-A-44 32 593, of DE-A-44 32 594 and of DE-A-44 44 775 are hereby also made part of the disclosure content of the present application by reference, since the clutches described here are particularly well suited for the safety belt arrangements disclosed there.

BRIEF DESCRIPTION OF THE DRAWINGS

The invention will now be described in the following by way of example and with reference to the drawings in which are shown.

DESCRIPTION

Figure 1:
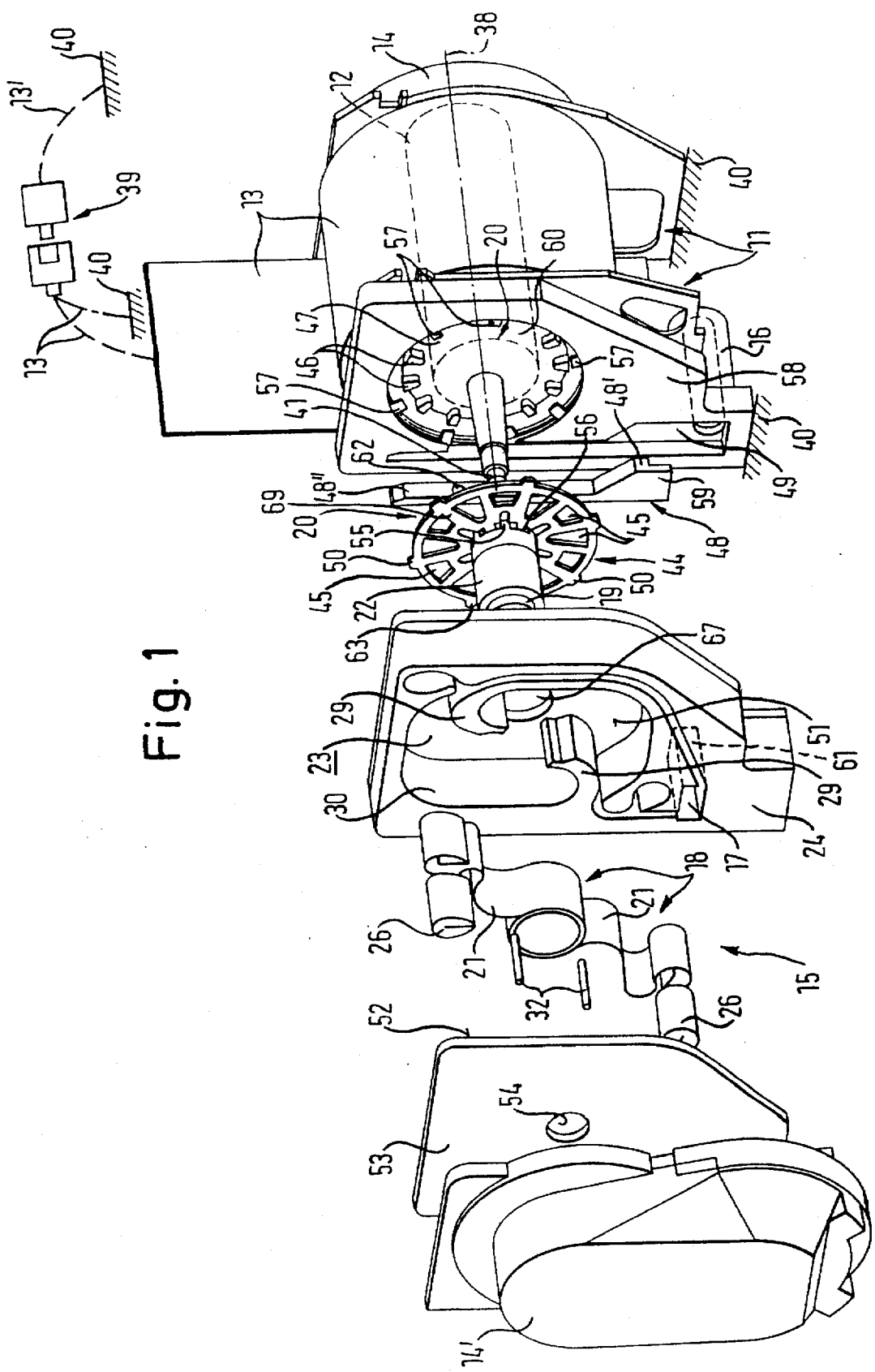
FIG. 1 a safety belt arrangement in a perspective exploded illustration having a belt tensioner operating with an ignitable pyrotechnical charge, with this safety belt arrangement forming the starting point for the present invention, FIG. 2 a somewhat enlarged perspective illustration of the same belt tensioner in the assembled state in perspective view from the opposite side to that of FIG. 1, FIG. 3 a perspective view of the same article seen more from the side of the auxiliary drive, however, with the one end face cover of the band running chamber and the retraction spring arrangement being omitted for the sake of clarity, and indeed with the auxiliary drive shown in the starting position directly after the start of ignition of the pyrotechnical charge, FIG. 4 a corresponding view to that of FIG. 3, but during a belt tensioning procedure which is already underway, FIG. 5 a schematic sectioned view of a further embodiment of an auxiliary drive with only one flexible draw band, FIG. 6 a schematic sectioned view analogous to FIG. 5 of a further embodiment with two flexible draw bands, FIG. 7 a cut-away perspective illustration of the drive reel of a belt tensioner in accordance with the invention with a hollow coupling space and with a clutch arranged therein, FIG. 8 a corresponding view to that of FIG. 7, but with only the cut-away drive reel being shown and with the components provided around it or in it being omitted, FIG. 9 a view analogous to FIG. 8, but seen obliquely from below instead of obliquely from above in FIG. 6, FIG. 10 a schematic section on the line X—X in FIG. 9, FIG. 11 a perspective exploded illustration of a further embodiment of a torque generating device of a belt tensioner in accordance with the invention with an integrated clutch, FIG. 12 a schematic perspective view of a modification of the embodiment of FIG. 11, FIG. 13 a partly broken away perspective illustration of a third embodiment of the safety belt arrangement of the invention having a belt tensioner, with a clutch displaced axially relative to the drive reel, FIG. 14 a schematic end view of the clutch shown in FIG. 13 in the direction of the torque generating device, FIG. 15 a partly axial sectioned view of a further advantageous embodiment of the invention, and FIG. 16 a schematic enlarged sectioned view in accordance with line XVI—XVI in FIG. 15.
Figure 2:
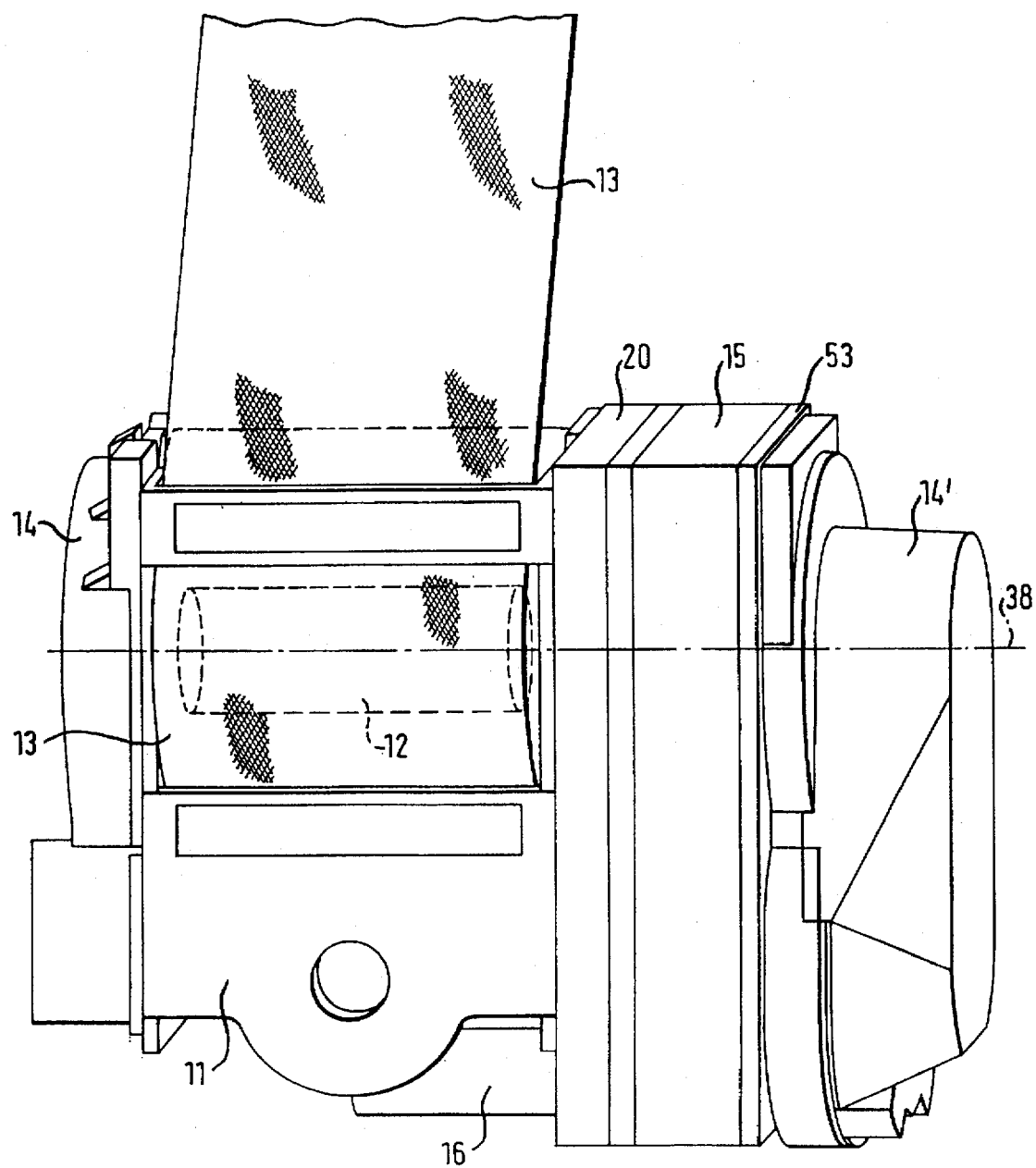

In accordance with FIGS. 1 and 2 a safety belt arrangement has a holder 11 which is, for example, to be mounted to the vehicle chassis 40 in the floor region of the passenger cell. A belt winding reel 12 which is rotatable about the central axis 38 is mounted to the holder 11 and a safety belt 13 is wound onto the belt winding reel 12. The safety belt extends in a manner which is only shown in broken lines in FIG. 1 via a belt lock 39 and, for example, a wire cable 13' to another position of the vehicle chassis 40, with the safety belt 13 lying in the customary manner against the non-illustrated body of a vehicle occupant. Furthermore it is indicated at the top right in FIG. 1 in chain-dotted lines that the safety belt 13 can also be a component of a three-point belt arrangement.

At the one end face of the belt winding reel 12 there is located a customary retraction spring arrangement 14 in which a non-illustrated retraction spring is provided which exerts a light belt draw-in torque on the belt winding reel 12, so that the safety belt which has been drawn out by the vehicle occupant and set in place can roll up onto the belt winding reel 12, to the extent that it lies loosely against the body of the vehicle occupant. Furthermore, a customary and non-illustrated belt draw-out blocking device is provided, in particular between the holder 11 and the belt winding reel 12, and is effective with a sudden pulling on the safety belt 13 or with accident-dependent accelerations and fixes the belt winding reel 12 in the then prevailing pull-out or draw-in position, so that a pulling out of the safety belt 13 at this position is prevented. The retraction spring arrangement can also be provided at the end face of the belt winding reel 12 or of holder 11 designated by 14' in FIGS. 1 and 2. For this purpose an inner shaft 41 indicated in FIG. 1 must extend rotatably through corresponding central bores of an auxiliary drive 15 which is to be described in the following and of a clutch 20 to the belt winding reel 12 and is rotationally fixedly connected to the latter. The arrangement of the retraction spring arrangement at 14' has the advantage that both the normal spring drive, and also the auxiliary drive of the belt winding reel 12 are effected from the same end face.

In accordance with FIGS. 1 and 2, an auxiliary drive 15 and a clutch 20 are arranged between the retraction spring arrangement which is preferably arranged at 14' and the holder 11, or the belt winding reel 12.

Figure 3:
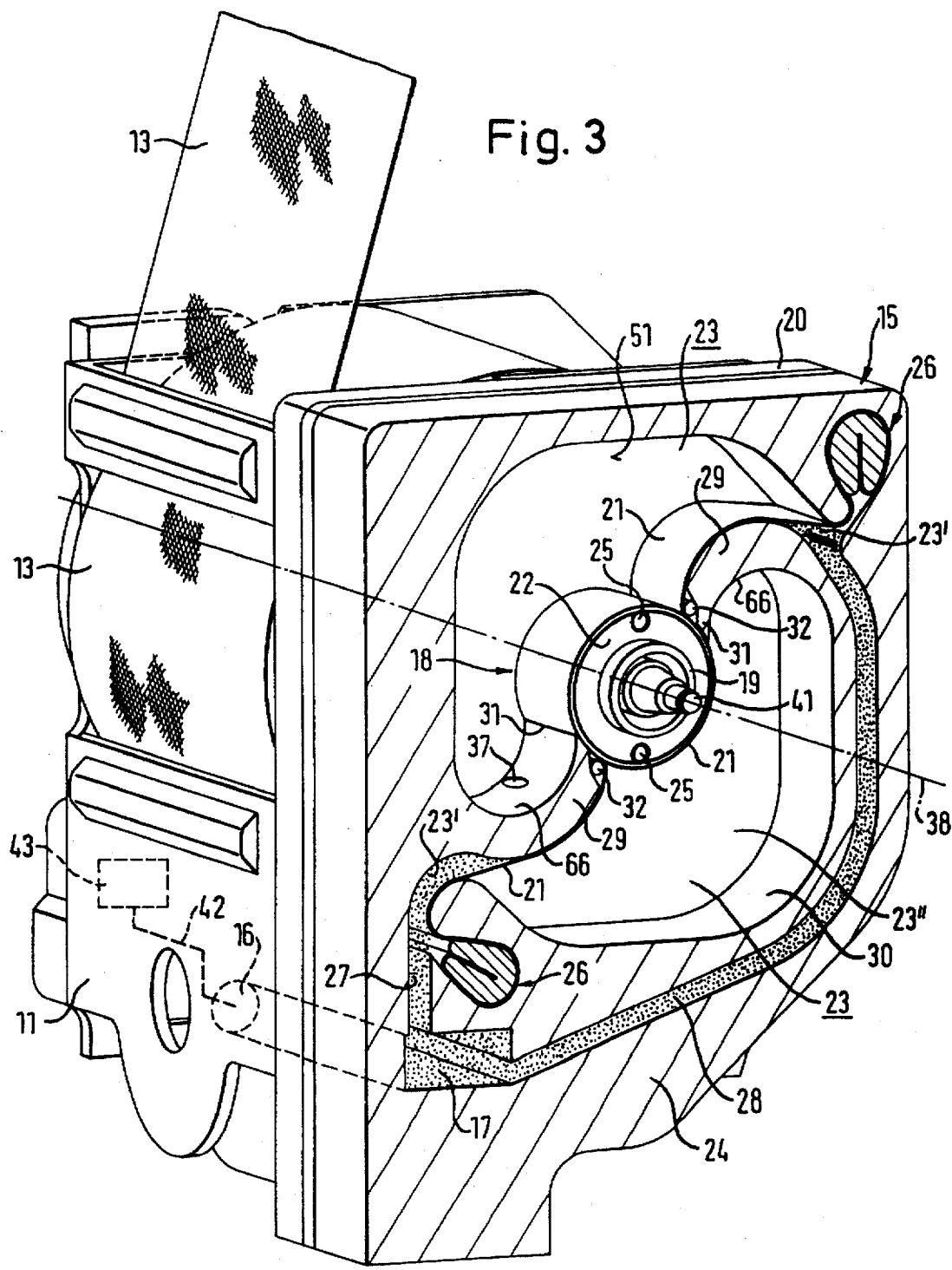

In accordance with FIGS. 1 and 3, the auxiliary drive 15 contains a torque generating device 18 which includes a drive shaft 19 coaxial to the axis of rotation 38 of the belt winding reel 12, and on which a drive reel 22 is rotationally fixedly and concentrically secured.

Two draw bands 21 consisting of spring sheet steel of approximately 0.2 mm thickness are wound in the counter-clockwise sense above one another in the view of FIGS. 1 and 3 onto the drive reel 22 and are rotationally fixedly connected to mounting points 25 at the periphery of the drive reel 22 to the latter.

In the starting position illustrated in FIGS. 1 and 3 there are in each case three to four layers of each draw band 21 wound onto the drive reel 22. Thereafter, each draw band 21 extends in arcuate manner through, in each case, one of two band running chambers 23 surrounding the drive reel 22 to respective mounting points 26 at the peripheral wall 30 of the housing 24 surrounding the band running chambers 23.

In the initial position of the belt tensioner which can be seen from FIG. 3 the arcuately formed part of the draw bands 21 lies with its concave surface against sealing walls 29 which are curved in the radial direction. The sealing walls 29 are formed in one piece with the housing 21 and extend approximately in scythe-like manner essentially radially inwardly to the layers of the draw bands 21 wound onto the drive reel 22. The sealing walls 29, in each case, form a tapering sealing lip 31 at the drive reel which ensures a sealed connection to the wound-on draw bands 21.

In the region of the sealing lips 31, bar-like sealing elements 32 are arranged between each sealing wall 29 and the draw band 21 lying on it and extend over the full depth of the band running chambers 23 which have essentially planar end walls 51, 52. The planar end wall 51 facing the belt winding reel 12 has a central passage bore 67 and, in the same way as the peripheral wall 30, forms a fixed component of the housing 24 of the torque generating device 18. The axially oppositely disposed end wall 52 of FIG. 1 is located at a cover 53 which can be mounted onto the open side of the housing 24, and also secured to it, and has a central bore 54 for the passage of the inner shaft 41 to the retraction spring arrangement 14'. The width of the draw bands 21 is so large that they sealingly and slidingly contact the end walls 51, 52 and thus subdivide the band running spaces 23 into two partial spaces 23', 23" which are sealed off from each other by the draw bands 21.

Branch lines 27 and 28, which respectively open at the convex sides of the sealing walls 29 in the region of the roots of the sealing walls 29 located at the peripheral wall 30, start from a common pressure space 17 which can be acted on by a pressure source 16. The pressure source 16 is connected via a control line 42 which is likewise only shown in broken lines in FIG. 3 to an acceleration sensor 43 which is likewise only shown in broken lines. In the event of an accident-dependent vehicle acceleration a pyrotechnical charge in the pressure source 16 is ignited so that a pressure can be built up abruptly in the pressure space 17. At the concave side of the sealing walls 29 there are provided vent openings 37 which lead to the ambient atmosphere and which, on triggering of the auxiliary drive 15, prevent an excessive pressure build-up in the partial spaces 23".

The branch lines 27, 28 open at the band running spaces 23 in such a way that they can subject the draw bands 21, which extend at the periphery of the band running spaces 23 transversely over the mouth of the branch lines 27, 28, to pressure.

In this manner the torque generating device 18, on triggering of the pyrotechnical charge 16, drives the drive shaft 19 in the belt winding direction, with the drive shaft being hollow, to receive the inner shaft 41.

A clutch 20, which will be described in the following with reference to FIG. 1, is provided between the auxiliary drive 15 with the torque generating device 18 and the belt winding reel 12. This clutch is normally disengaged in order to permit an unhindered interplay between the retraction spring arrangement 141 and the belt winding reel 12 via the inner shaft 41. Only when an accident-dependent acceleration occurs and the torque generating device 18 is intended to abruptly tension the belt 13, does the clutch 20 have to engage in order to be able to transmit the torque generated by the torque generating device 18 to the belt winding reel 12.

In accordance with FIG. 1, the drive reel 22 is provided at its side axially remote from the torque generating device 18 with axially or radially projecting cam wedges 55 which engage in complementary peripheral slots 56 at the outer margin of the central bore of a coupling disc 44 in such a way that in the circumferential direction a specific clearance exists between the cam wedges 55 and the peripheral walls of the peripheral slots 56, however in such a way that the drive reel 22 causes the clutch disc 44 to move with it in a rotary movement after overcoming this clearance.

At its outer periphery the clutch disc 44 has, in accordance with FIG. 1, radially outwardly projecting holding noses 50 distributed over its circumference, which engage behind counternoses 57, which project from the clutch housing 58 radially inwardly into the hollow receiving space 60 for the clutch disc 44 in such a way that the clutch disc 44, which is pushed forwardly in the direction towards the belt winding reel 12 from the end face of the drive reel 22, or from an intermediate piece secured thereto, is initially held radially outwardly by the counternoses 57 against axial displacement. The clutch disc 44 which is formed of resilient material, in particular of spring steel, is thereby resiliently conically deformed.

In accordance with FIG. 1, the clutch disc 44 has, in its radially outer region, but radially inwardly from the holding noses 50, engagement recesses 45 which are uniformly distributed about the circumference. These engagement recesses 45 are associated with the axially projecting engagement noses 46 at the end guidance disc 47 of the belt winding reel 12 axially confronting the torque generating device 18, but are however out of engagement with the engagement recesses 45 in the position of the coupling disc 44 where their holding noses 50 axially contact the counternoses 57.

As a result of the described arrangement, the clutch disc 44 is normally in the disengaged position so that the belt winding reel 12 can rotate freely unhindered by the drive reel 22 and only cooperates with the retraction spring arrangement 14' via the inner shaft 41 which extends through the bore 67.

In order to engage the clutch 20, a displacement recess 49 is arranged in the clutch housing 58 alongside the clutch disc 44 and extends substantially tangential to the clutch disc 44. In the displacement recess 49 there is arranged a slider 48 which likewise extends tangentially and can be displaced in the displacement recess 49 tangential to the clutch disc 44.

The slider 48 has at the top an actuating bar 48" and at the bottom a broadened piston region 48' with a valve wall 59 which can be broken away. Beneath the lower end face of the piston region 48' there is located the pyrotechnical charge 16. A pressure passage 61 branches off from the displacement recess 49 in the direction of the torque generating apparatus 18 and stands in flow communication with the pressure space 17.

When the slider 48 is located in the starting position, the piston region 48' blocks the connection between the pyrotechnical charge 16 and the pressure passage 61.

In the upper region, the actuating bar 48" of the slider 48 has an abutment 62 radially opposite to the clutch disc 44 and projecting in the direction towards the clutch disc 44. The abutment 62 stands in engagement with a counterabutment 63 provided at the periphery of the clutch disc 44 in such a way that on displacement of the slider 48 upwardly, the clutch disc 44 is rotated in the clockwise sense.

The pyrotechnical charge 16 which is generally of cylindrical shape can be arranged in accordance with FIG. 1 at the side of the clutch 20 facing the belt winding reel 12 parallel to and beneath the belt winding reel 12. It is important that on triggering of the pyrotechnical charge 16 it is first only the slider 48 which is subjected to pressure and that the torque generating device 18 is also subjected to pressure only after engagement of the clutch 20.

The manner of operation of the belt tensioner when operated is as follows:

When the acceleration sensor 43 (FIG. 3) determines an accident-dependent acceleration at the vehicle, then it triggers the pyrotechnical charge 16 via the control line 42. Thereafter, this does not immediately act on the torque generating device 18, as is shown for reasons of simplicity in FIGS. 3 and 4, but rather, in accordance with FIG. 1, first only acts on the piston region 48' of the slider 48 so that this is displaced out of the rest position into the coupled-in position and thereby moves the clutch disc 44 with it, so that it executes a rotary movement.

During this, the holding noses 50 of the clutch disc 44 are displaced in the peripheral direction along the stationary counternoses 57 until these come out of engagement with one another.

The path of displacement of the slider 48 and rotary movement of the clutch disc 44 are so calculated that in the first stage of the movement the holding noses 50 and the counternoses 57 come out of engagement, whereupon the clutch disc 44 snaps over in the direction towards the end face guide disc 47. During this, the engagement noses 46 can engage into the engagement recesses 45 should these two elements by chance be axially aligned. Should this not however by the case, the web 60 of the clutch disc 44 contact the engagement noses 46. The clutch disc 44 is now turned on further in a second stage of the movement of the slider 48 until the engagement recesses 45 finally snap over the engagement noses 46.

The peripheral slots 56 must permit a rotation of the clutch disc 44 relative to the drive reel 22 or the wedge cams 55 which enables the two stages of movement.

As a result of the described design of the clutch 20 with numerous engagement recesses 45 and engagement noses 46 distributed over the periphery, the requirement for the transmission of considerable torques via the clutch 20 is taken into account.

Figure 5:
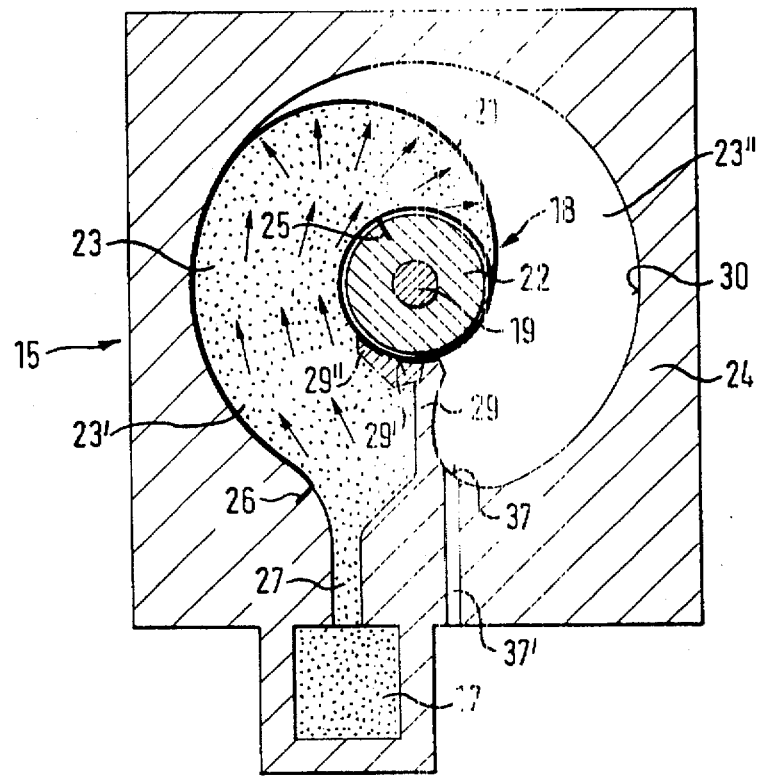

In the embodiment of FIG. 5, the flexible draw band 21 extends through the band running space or chamber 23 with the same sense of curvature which it has at the drive reel 22 up to the peripheral wall 30 which lies radially opposite to the drive reel 22 and preferably concentric to the drive shaft 19 and is secured there to the housing 24 at 26 in the region of the opening of an explosion pressure feedline 27' in the band running chamber 23.

Between the housing 24 and the periphery of the drive reel 22, or of the draw band 21 wound up thereon, a sealing wall 29 extends substantially parallel to the feedline 27' and close to the latter to the periphery of the drive reel 22. Here a sealing lip 29' is provided which sealingly contacts the draw band 21 in the wound-up state. In this manner, the partial spaces 23', 23" are decoupled from one another pressurewise. In addition to the sealing wall 29 the vent bore 37 is also located at a peripheral end of the band running chamber 23 in the direction of propagation of the flexible draw band 21. The vent bore 37 leads via a vent passage 37' into the ambient atmosphere.

As shown in chain-dotted lines and in fine hatching in FIG. 5, the sealing wall 29 preferably has an extension 29" towards the partial chamber 23', so that the sealing lip 29' is somewhat extended in the direction of the pressure space 23'. The projection 29" is flexibly formed and could also be hingedly secured to the actual sealing wall 29, and indeed about a pivot axis which extends parallel to the axis of the drive shaft 19. In this manner, the sealing lip 29' is pressed by the pressure in the partial space 23', so that it seals particularly well against the outer surface of the draw band 21 which is wound onto the drive reel 22.

Figure 4:
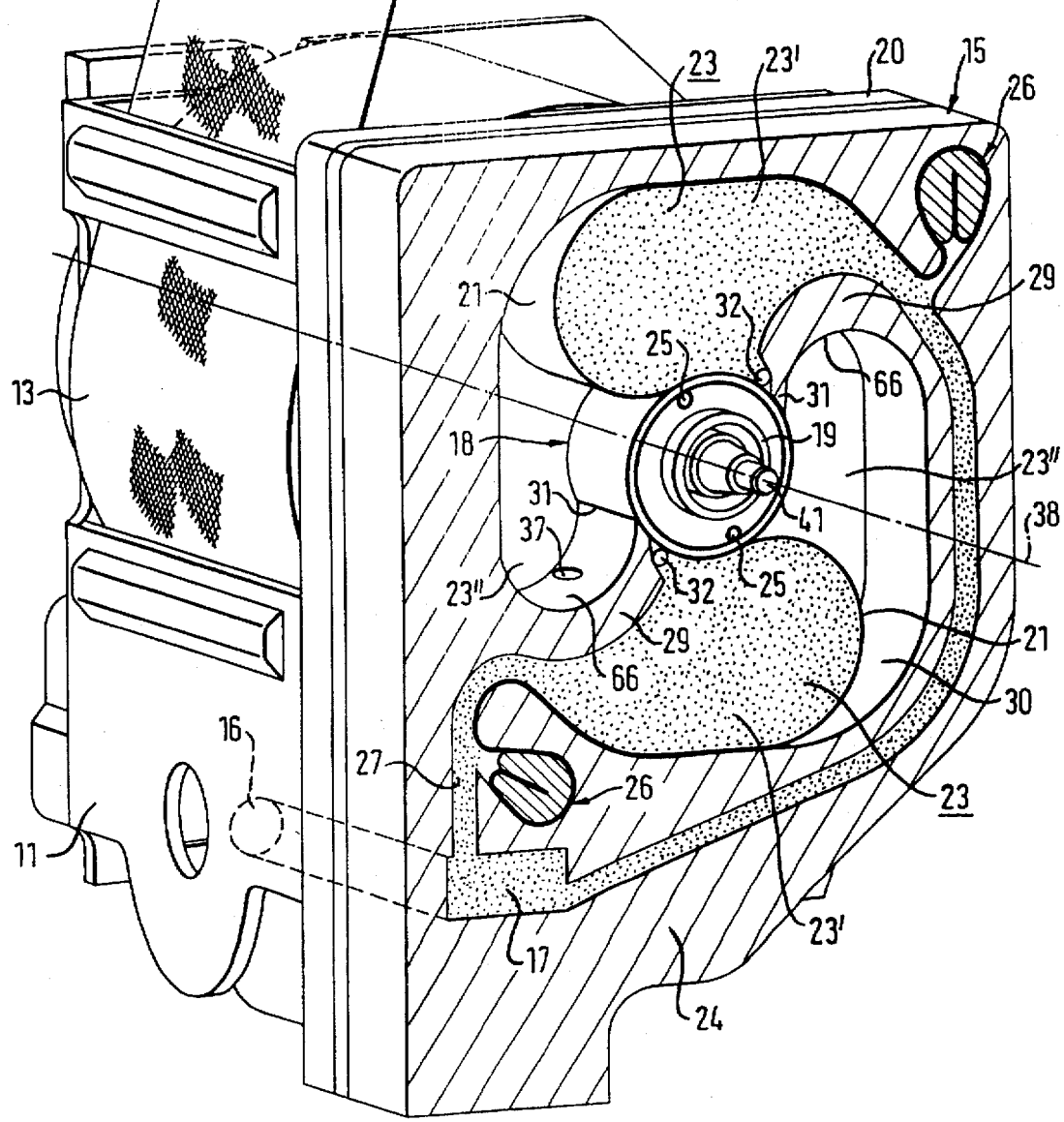
Figure 6:
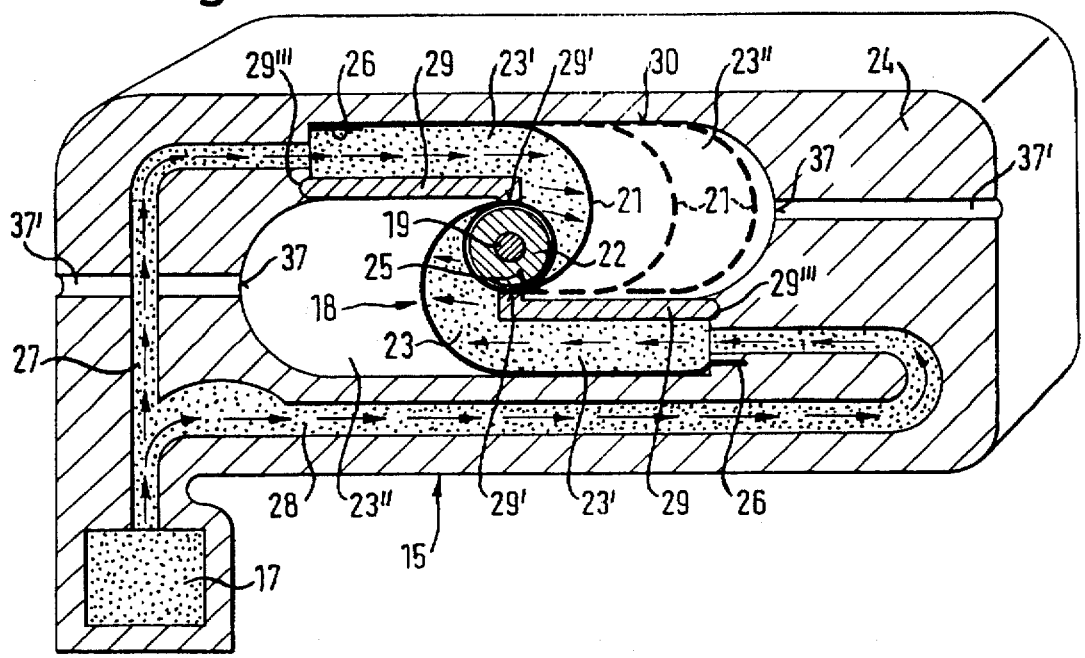

FIG. 6 shows a similar embodiment to that of FIGS. 3 and 4 in which, however, in similar manner to the embodiment of FIG. 5, the flexible draw bands 21 extend through the band running chambers 23 to the peripheral wall 30 without reversal of the sense of curvature which they have on the drive reel 22 and are secured at the peripheral wall 30 at 26 to the housing 24.

In this embodiment the partial spaces 23" at the peripheral end are vented via a vent bore 37 and a subsequent vent passage 37' to the ambient atmosphere.

The substantial advantage of the embodiment of FIGS. 5 and 6 lies in the fact that the pressure can propagate in the partial space 23' up to the sealing lip 29' of the sealing wall, or of the sealing walls 29, so that the region of the flexible draw band 21 which extends freely through the band running chambers 23 and is responsible for the generation of the tensile force brought about by the pressure loading is considerably enlarged in comparison to the embodiment of FIGS. 3 and 4, and indeed in the present embodiment by the diameter of the drive reel 22. For the same pressure, the tensile force of the flexible draw band 21 which sets the drive reel 22 in motion is thus decisively increased.

In FIG. 6 the flexible draw band 21 is shown in solid lines at the start of a pressure loading and also in broken lines in two further advanced stages of a pressure triggering in which the safety belt has already been more strongly tensioned.

Particularly important is the longitudinal extent of the sealing walls 29 essentially tangential to the drive reel 22. Furthermore, the sealing walls 29 are flexible in accordance with the invention, i.e. are made particularly elastically resilient or are, for example, pivotally connected to the housing 24 at 29'''. The sealing walls 29 can also be pre-stressed in the direction towards the flexible draw band 21 wound onto the drive reel 22 by low spring forces so that the sealing lips 29 are lightly pressed against the outer surface of the wound-up draw band 21.

In this manner, each pressure loading of the surface of the sealing walls 29 facing the partial spaces 23' leads to a situation where the sealing lips 29' of the sealing walls are pressed against the outer surface of the draw band 21 wound onto the drive reel 22, whereby a sealing action which increases with the pressure in the partial space 23' is achieved between the sealing lip 29' and the drive reel 22, or the draw band 21 wound onto it.

Furthermore, the draw band 21 is also pressed in advantageous manner radially from the inside towards the outside against the sealing lip 29' by the pressure in the associated partial space 23' which acts on it.

In the following Figures the same reference numerals are used to designate corresponding components to those in the preceding description.

In the embodiment of FIGS. 7 to 10, the drive shaft 19 or the drive reel 22 onto which the draw band 21 is wound is formed as a pot which is open downwardly and has a central bearing opening 92 at the top. A substantially right-cylindrical rotary clutch member 65 is arranged in the hollow coupling cavity 100 of the pot concentric to the axis of rotation 38, with the axle of the rotary clutch member 65 likewise being concentric with the axis of rotation 38 and being provided at its periphery with a clutch engagement surface 66 which is formed as a toothed arrangement with teeth extending parallel to the axis of rotation 38. Other surface designs are fundamentally also possible which ensure the clutch engagement which is described here further below. A hub 84 of the rotary clutch member 65 which is rotatably journalled in the bearing opening 92 is rotationally fixedly connected in a manner which can be seen from FIG. 15 to the belt winding reel 12 and is preferably also arranged concentric to it. The inner shaft 41 is centrally secured to the end face of the rotary clutch member 65 which is not visible in FIG. 7 and which faces away from the hub 84 and can also take on a journalling function.

The clutch engagement surface 66 which is formed as toothed arrangement has a radial spacing from the radially inner rotary engagement surface 64 of the drive reel 22 which is provided with a plurality of individual cam surfaces 86. The cam surfaces 86 respectively start from a part circular recess 87 in which, in each case, a resilient clutch pin 68 is accommodated, the foot of which is fixedly mounted to a housing end wall 70 provided at the housing 24. Both the clutch pins 68 and also the recesses 87 extend parallel to the axis of rotation 38.

In the normal position the clutch pins 68 are in an engagement with the edge of the recesses 87, i.e. with the drive reel 22, but have however a slight radial spacing from the clutch engagement surface 66.

The precise layout and the precise arrangement of the individual components can be seen from the following functional description of the embodiment of FIGS. 7 to 10:

When, in the case of an accident-dependent acceleration, the pressure source 16, i.e. preferably the pyrotechnical charge, is triggered, the draw band 21 is subjected to pressure in the manner described above with reference to FIGS. 5 and 6, whereby the drive reel 22 is set in rotation in the direction of the arrows in FIGS. 7 to 10.

Figure 9:
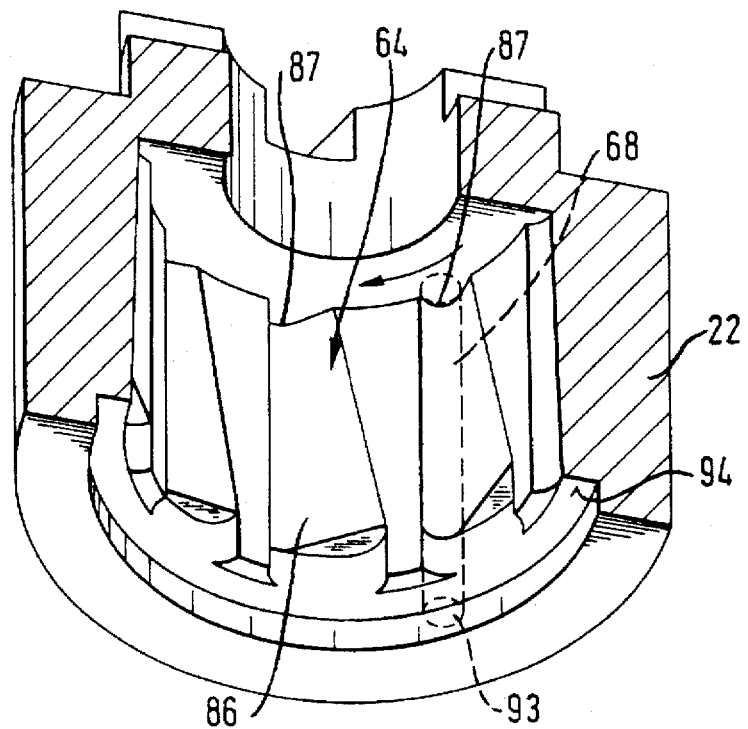
Figure 10:
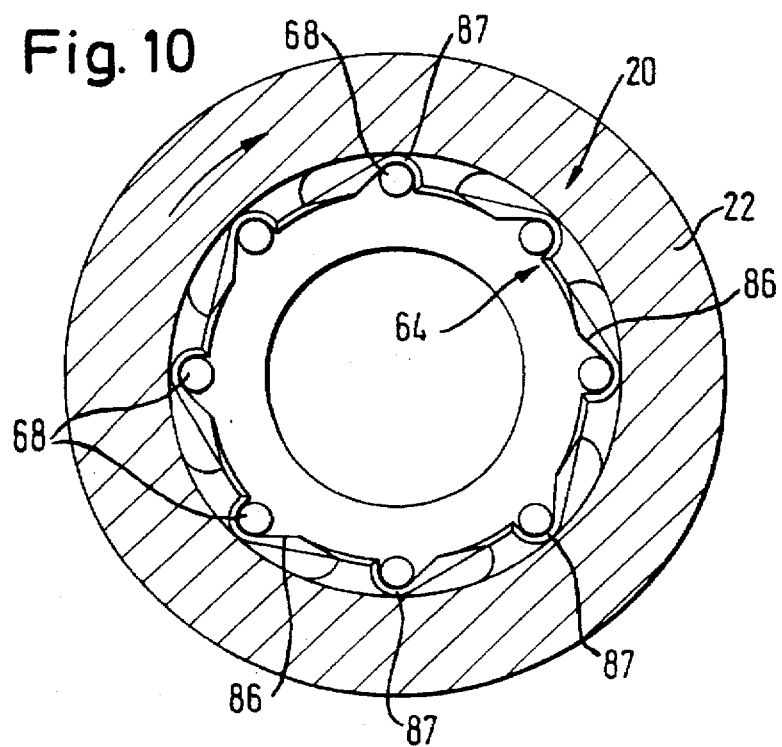

During this, the clutch pins 68, of which one is also indicated in broken lines in FIG. 9, slide along the cam surfaces 86 in the peripheral direction, whereby they are pressed radially inwardly into the teeth of the clutch engagement surface 66. For this purpose, the clutch pins 68 must be resiliently or hingedly designed, at least in the region of their roots 93 where they are secured to the housing end wall 70. It is also possible to design the clutch pins 68 so that they shear off in their root region during the movement radially inwardly and can thereby be displaced radially inwardly into the teeth of the toothed arrangement 66.

The cam surfaces 86 thereby extend obliquely and radially inwardly to such an extent that the relative rotary movement between the drive reel 22 and the rotary clutch member 65 is slowed down after an angle of approximately 100 because a form-locked coupling has now been formed between the rotary engagement surface 64 and the toothed clutch engagement surface 66 via the plurality of coupling pins 68. From now on, the drive reel 22 moves the rotary clutch member 65 and thus the belt winding reel 12 with it to execute a rapid rotary movement in the winding-up direction.

The drive shaft 19 of FIG. 7 is formed as a collar at the drive reel 22 and the hub 84 engages into its bearing opening 92 in the manner of a rotary bearing.

The cam surfaces preferably change in the axial direction in such a way that the clutch pins 68 are first urged radially inwardly at the end remote from the root 93 and then, on further rotation of the drive reel 22, more and more also in the regions lying closer to the root 93. In this manner, the clutch pins 68 are first resiliently bent at the top and then also more and more further downwardly towards the clutch engagement surface 66. When the cam surface 86 finally also acts on the clutch pins 68 in the region of their roots 93 and presses them radially inwardly, the clutch pins 68 can then brake off or shear off at or close to their roots 93. However, since they are simultaneously clamped between the rotary engagement surface 64 and the clutch engagement surface 66, they are spatially fixed now as before in a clear manner, however now in such a way that they can participate in the rotary movement of the drive reel 22.

In order that the shearing off of the clutch pins 68 close to their roots is favoured and, moreover, space is formed for accommodating any fractured pieces, a radially outwardly projecting ring recess 94 is provided at the lower edge of the rotary engagement surface 64 which, however, only extends in the axial direction away from the roots 93 of the clutch pins 68 by a relatively small amount.

When, after belt tensioning and dissipation of the pressure generated by the pyrotechnical charge, the belt is loaded again in the pull-out direction by the person falling into the belt, the flexible draw band 21 is disengaged from the drive reel 22 as a result of the relaxation that has taken place as is described with reference to FIGS. 7 and 8 of DE-A-44 44 475. The drive reel 22 is now released from the draw band 21 and the belt mechanism can again operate in the normal manner, i.e. be pulled out with a low force and be drawn back again by the retraction spring arrangement. Only the drive 15 is no longer operable because it is only laid for a single belt tensioning procedure. After an accident it must in each case be exchanged.

Figure 15:
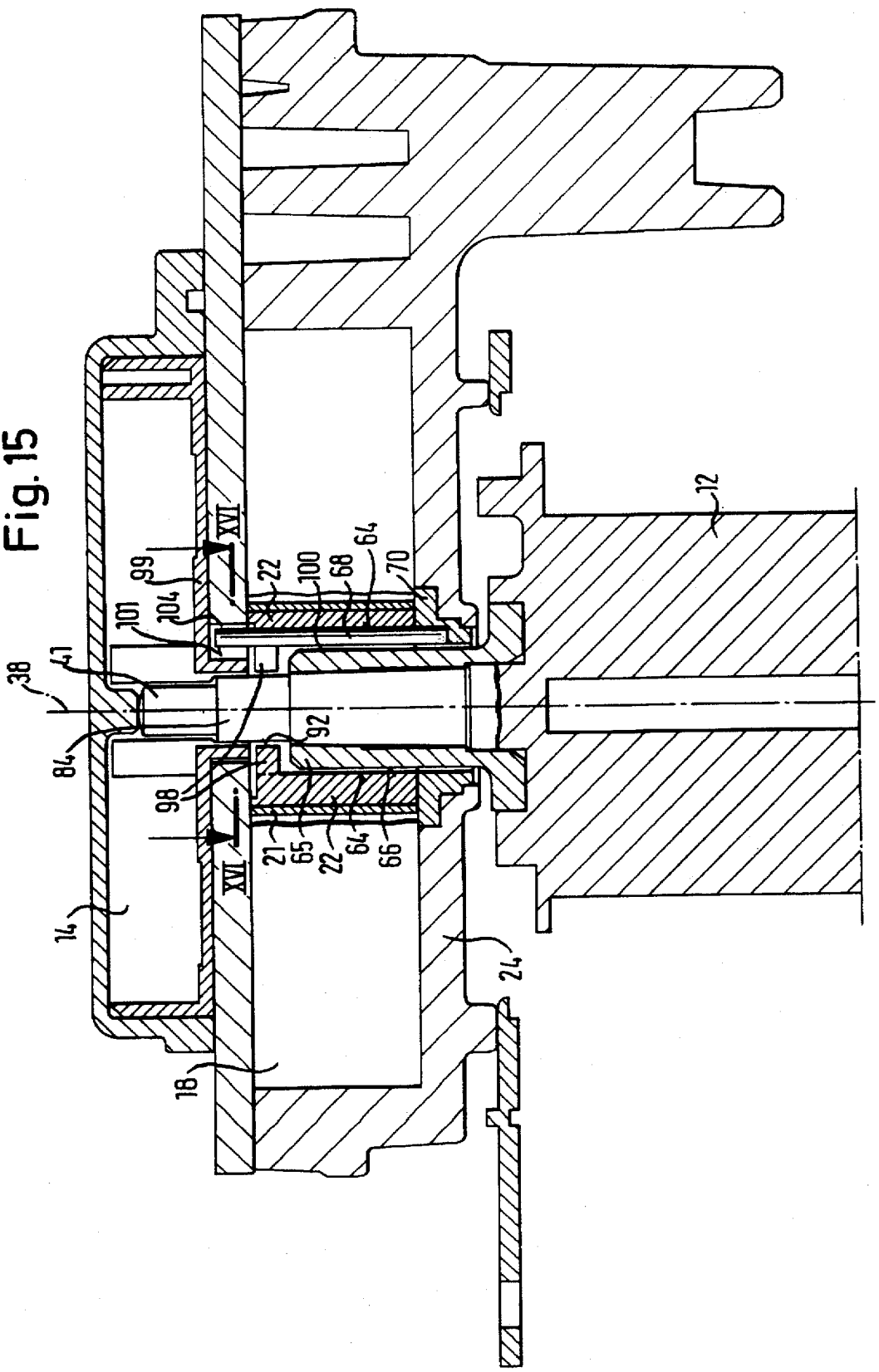
Figure 16:
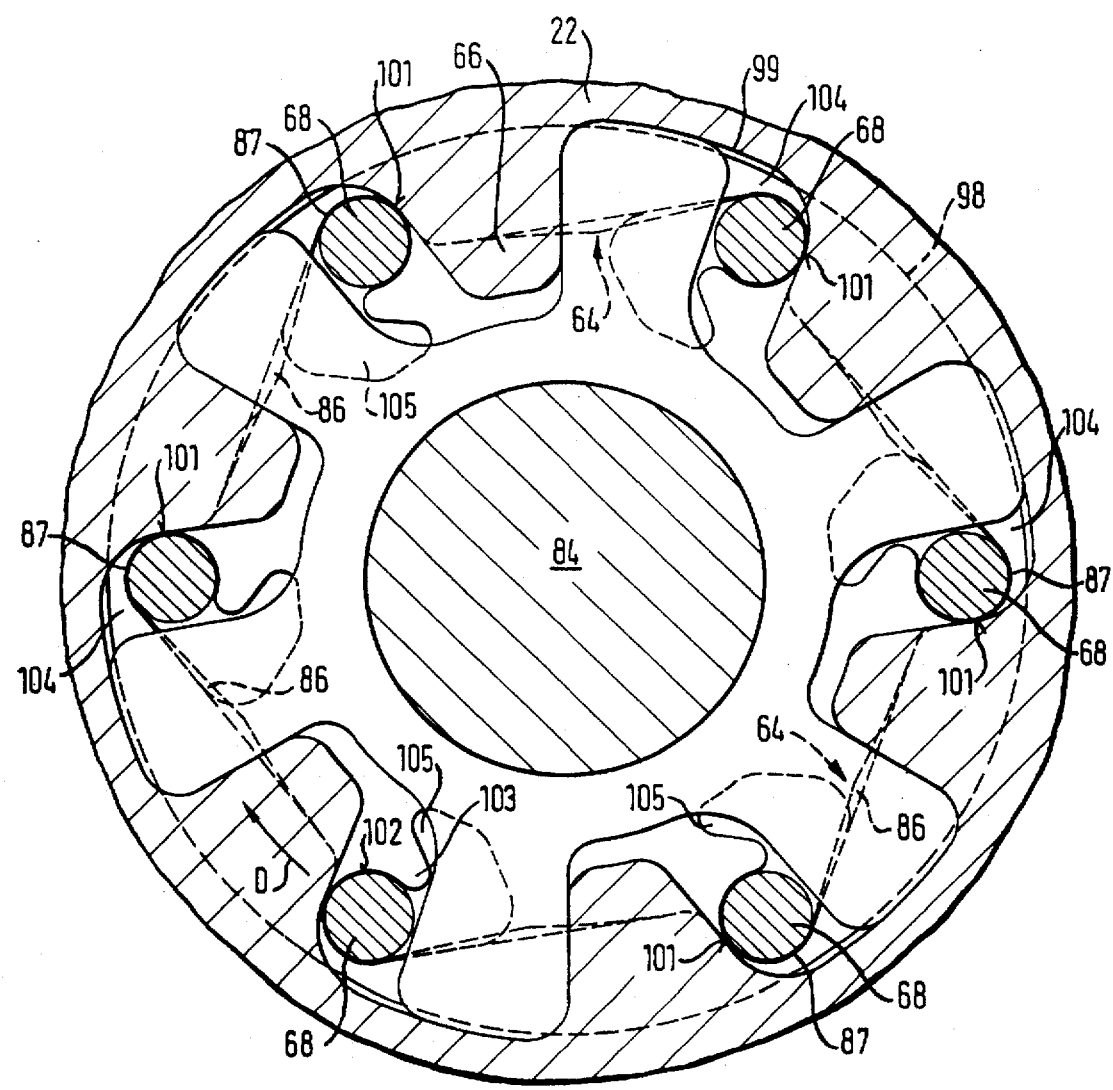

In order that the ends of the clutch pins 68 remote from the end wall 70 can also be held in trouble-free manner during assembly and also during release, the embodiment of FIGS. 15 and 16 makes provision for the clutch pins 68 to be extended in the end region remote from the lower end wall 70 and to first engage in the axial direction through holding mounts 102 in a centering ring 98 which is rotationally fixedly secured radially inwardly to the drive reel 22, preferably in one piece, and which radially inwardly has the bearing opening 92 for the hub 84 of the belt winding reel 12.

As can be seen in particular from FIG. 16, the mounting recesses 102 are partly open at the side opposite to the direction of rotation D, whereby a holding/deviating nose 103 which can be sheared off closes this opening to such an extent that the ends of the clutch pins 68 are initially held in form-locked manner by the centering ring 98.

In accordance with FIG. 15, the coupling pins 68 extend, after passing axially through the mounting recesses 102, within receiving spaces 104 of a cover 99 which closes off the retraction spring arrangement 14 at the bottom in FIG. 15.

In accordance with the FIGS. 15 and 16, the receiving spaces 104 are closed off in the peripheral direction by a respective abutment surface 101 which stands in peripheral engagement with the end of the coupling pins 68 which passes through the holding recesses 104. A receiving space 104 and an abutment surface 101 is provided for each coupling pin 68.

The manner of operation of the embodiment of FIGS. 15 and 16 is as follows:

During the assembly, the clutch pins 68 which are pushed into corresponding openings of the end wall 70 are positioned through the recesses 102 in the centering ring 98. At the same time, the centering ring 98 centers the drive reel 22.

The pins 68 are simultaneously axially positioned (upwardly in FIG. 15) through engagement of the ends of the clutch pins 68 remote from the end wall 70 into the receiving spaces 104 because they terminate at a small spacing from the cover 99.

If now a triggering of the torque generating device 18 takes place, i.e. the drive reel 22 is suddenly set in rotation in the direction of the arrow D in FIG. 16, the two ends of the coupling pins 68 are held firmly by the end wall 70 fixed relative to the housing, or by the abutment surfaces 101 of the cover 99, against being moved by the centering ring 98 which is now set in motion in the direction of the arrow D in FIG. 16.

In this way the clutch pins 68 shear off in the region of their mounting to the end wall 70. Furthermore, the holding/ deviating noses 103 of the centering ring 98 are sheared off. At the same time, the clutch pins 68 are controlled through the cam surfaces 86 (FIG. 16) to move radially inwardly into the clutch engagement surface formed by a toothed arrangement. For this purpose, the abutment surfaces 101 should be arranged in axially extending radial planes relative to the axis 38.

The embodiment of FIGS. 15 and 16 thus ensures a particularly good mounting, and also a particularly defined control of the clutch pins 68.

Figure 11:
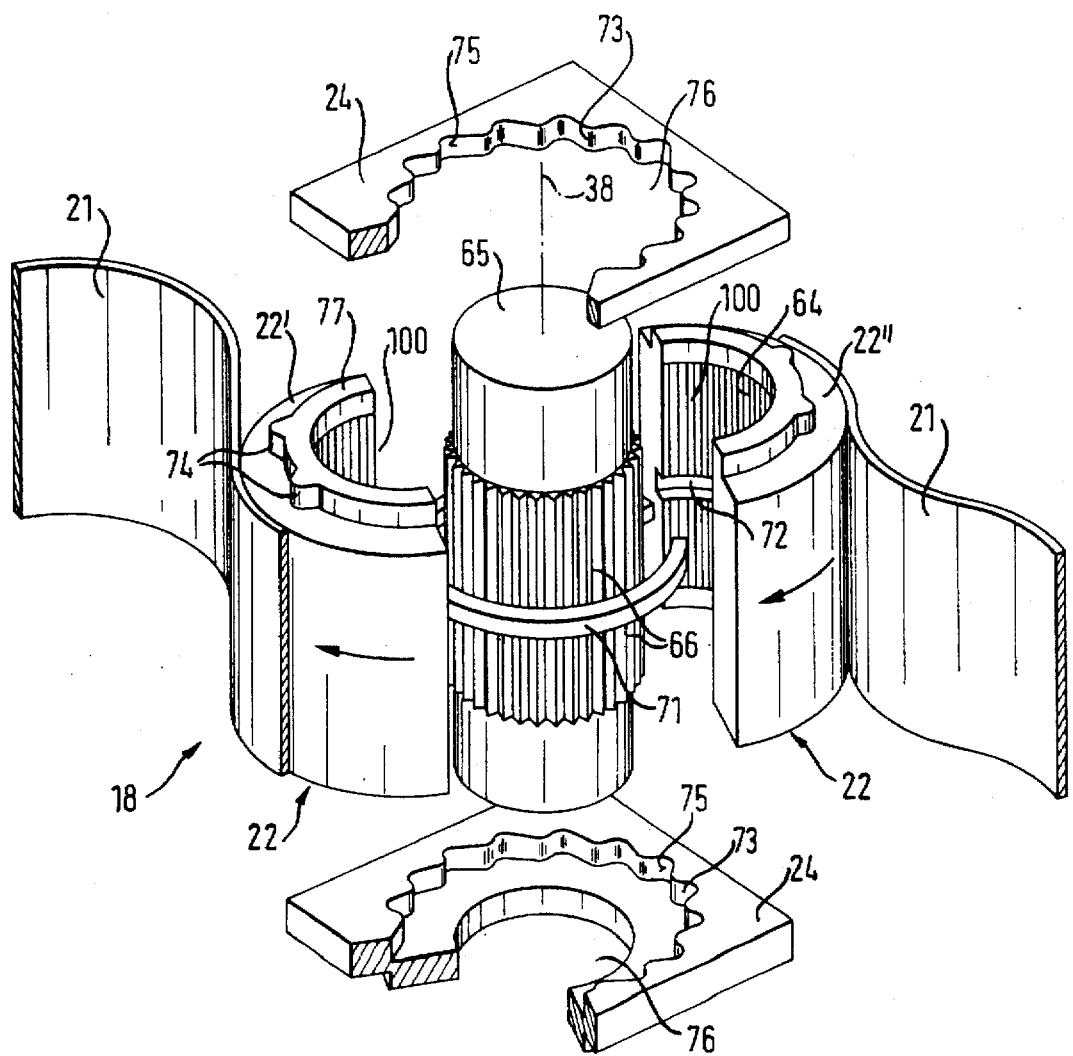
Figure 12:
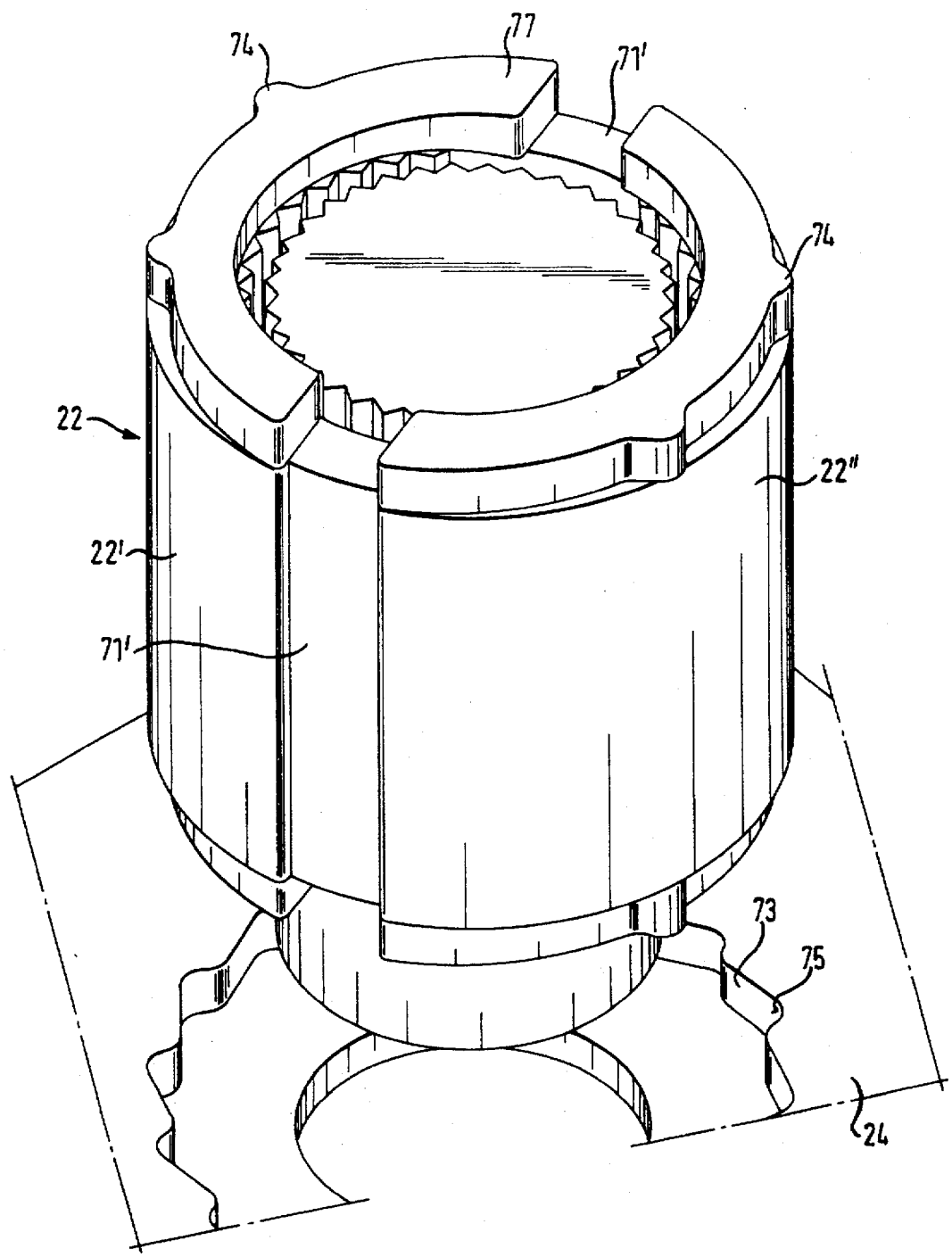

In the embodiment of FIGS. 11 and 12, the drive reel 22 is put together from two semi-circular shaped hollow sectors 22', 22", which are so pressed apart from one another by a spring element 71, 71' that they adopt the relative position which is evident from FIG. 12. In accordance with FIG. 11, the spring element is formed as a spring ring 71 arranged in the interior of the hollow sectors 22', 22" concentric to the axis of rotation 38 and is radially displaceably accommodated in a peripheral groove 72 which is provided at the inner periphery of the hollow sectors 22', 22". At their end faces, the hollow sectors 22', 22" have axially projecting concentric abutment rings 77 which are provided at their periphery with radially outwardly projecting cam teeth 74. Each abutment ring 77 is arranged in a central recess 76 of the housing 24. The outer wall of the recess 76 forms a radial abutment surface 73 which is provided with radially outwardly projecting cam recesses 75 which cooperate with the cam teeth 74 of the abutment rings 77. In the assembled state the abutment rings 77 are located within the recesses 76, with the two hollow sectors 22', 22" being spread apart by the radially outwardly stressed spring ring 71 and thereby pressing the cam teeth 74 into the cam recesses 75. In this way, the movement of the hollow sectors 22', 22" away from one another which is brought about by the spring rings 71 is restricted.

The inner surface of the hollow sectors 22', 22" is formed as a rotary engagement surface 64 which can, for example, be provided with a toothed arrangement extending parallel to the axis of rotation 38. A clutch engagement surface 66 at the periphery of a rotatable clutch member 65 which is again rotationally fixedly connected in a non-illustrated manner to the belt winding reel 12 or to the inner shaft 41 lies radially inwardly opposite to the rotary engagement surface 64. The clutch engagement surface 66 is formed as a toothed arrangement, the teeth of which extend parallel to the axis 38 of rotation and parallel to the toothed arrangement of the rotary engagement surface 64. Any other form of surface layout, for example crossed knurling, is however also possible which enables a secure coupling engagement between the surfaces 64 and 66.

With the spread apart hollow sectors 22', 22", the rotary engagement surface 64 and the clutch engagement surface are out of engagement.

With the normal clearance of the belt winding reel 12, the rotary clutch member 65 can thus rotate in both directions unhindered by the drive reel 22 which is located in the rest position.

If now a triggering of the pressure source 16 occurs, then the draw bands 21 set the drive reel 22 in a rotating movement in the direction of the arrows in FIG. 11, whereby the cam teeth 74 are lifted out of the cam recesses 75 which are provided with corresponding flanks and thereby move the two hollow sectors 22', 22" towards one another against the action of the spring ring 71 until the rotary engagement surface 64 comes into coupling engagement with the clutch engagement surface 66.

By a suitable design of the peripheral length of the clutch recesses 75 or of the clutch teeth 74 it can be ensured that the clutch engagement is already achieved after an angle of rotation of about 100. From now on, a frictional, and preferably formed-shaped connection is present between the drive reel 22 and the rotary clutch member 65. The radial depth of the cam teeth 74 and of the cam recesses 75 are selected in such a way that they come out of engagement after coupling engagement has been produced between the hollow sectors 22', 22". From now on, the two hollow sectors 22', 22" are, however, held together by the considerable force acting on the draw bands 21 during an expansion and are held in coupling engagement with the rotary clutch member 65 until the pressure generated by the pyrotechnical charge has dropped off. Then the spring ring 71 presses the two hollow sectors 22', 22" apart again until the cam teeth 74 have reached the base of the cam recesses 75. The two hollow sectors 22', 22" are now fixed again in the decoupled state and the rotary clutch member 65 can rotate freely at both sides. In this case, special measures to re-establish the free rotatability of the rotary clutch member 65 after triggering can be dispensed with in advantageous manner.

The particular advantage of the embodiment of FIG. 11 lies in the fact that the two hollow sectors 22', 22" are compulsorily controlled by the cam surface pairs 74, 75 into the coupling position during triggering in which they then remain as a result of the tensile force of the draw bands 21 until the belt tensioning has been terminated. The controlling of the movement into the coupling position does not therefore have to be produced by the winding force of the draw bands 21 itself.

In the modification of FIG. 12, two resilient elements 71' are laid into the intermediate space between the oppositely disposed axial edges of the two hollow sectors 22', 22" instead of using the spring ring 71 in the interior of the hollow sectors 22', 22" and are pressed together by the cam surface pairs 74, 75 on rotation of the drive reel 22. In other respects, the embodiment of FIG. 12 functions in similar manner to that of FIG. 11.

Figure 13:
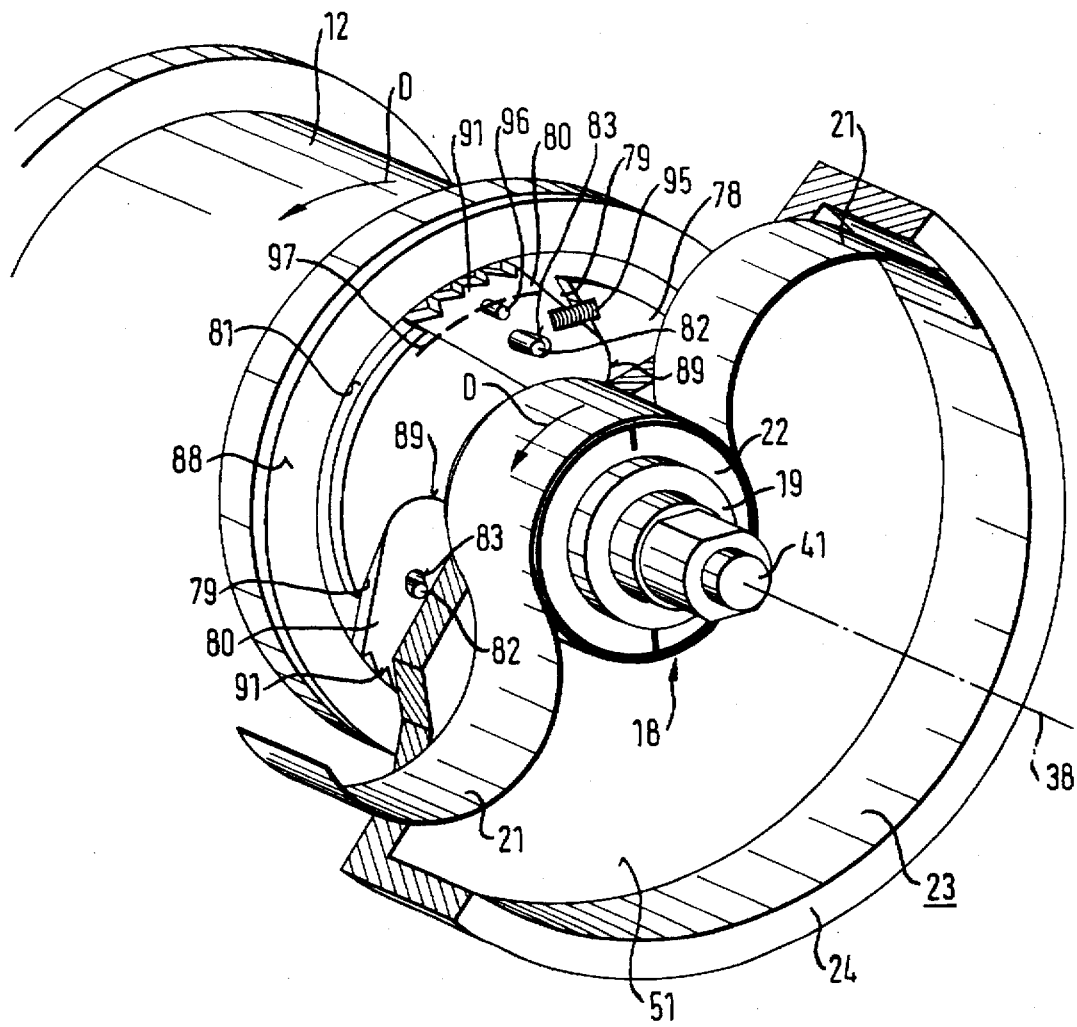
Figure 14:
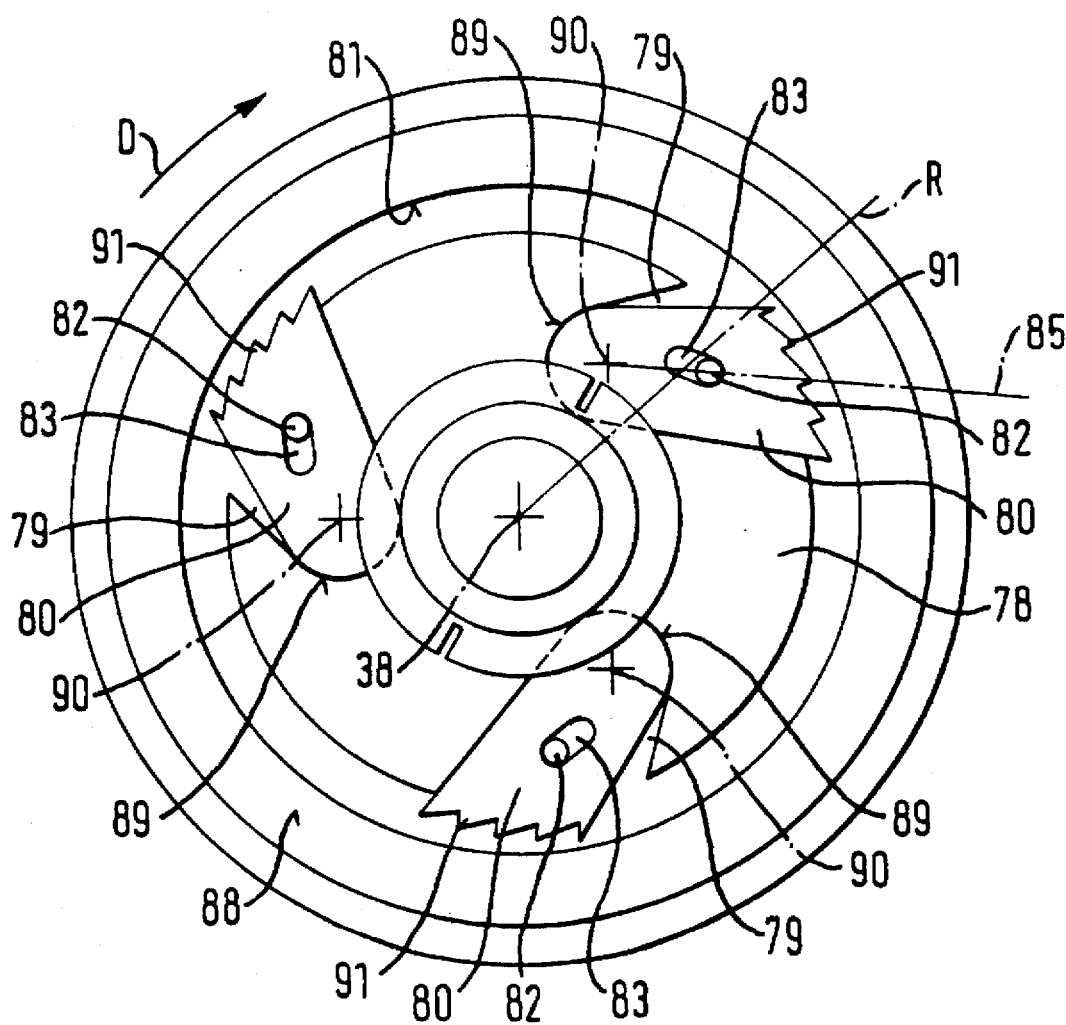

In the embodiment of FIGS. 13, 14 a flat clutch disc 78 axially adjoins the end wall 51 of the band running chamber 23 in the direction of the belt winding reel 12 and is rotationally fixedly connected to the drive shaft 19 or to the drive reel 22. Two to four, in particular three clutch segment receiving recesses 79 are preferably uniformly distributed around the periphery of the clutch disc 78 and are obliquely arranged in the belt winding direction indicated by the arrow D in the sense that their longitudinal axis 85 (FIG. 14) includes an angle with the radius R at this position such that the longitudinal axis 85 lies in front of the relevant radius R in the direction of rotation D.

For this purpose, complementary clutch segments 80 are laid into the clutch segment receiving recesses 79. Both the clutch segment receiving recesses 79 and also the clutch segments 80 have essentially semi-circular edges 89 radially inwardly, with the clutch segment receiving recesses 79 being made broader in the peripheral direction then the clutch segments 80 by an amount such that the clutch segments 80 can execute a small pivotal movement about an axis 90 (FIG. 14) extending parallel to the axis of rotation 38. Radially outwardly, the clutch segments 80 are provided with a toothed arrangement 91.

In their middle region, the clutch segments 80 have elongate control apertures 83 extending somewhat obliquely to their longitudinal axes 85, with control pins 82 which are secured to the end wall 51 of the housing 24 engaging axially into the elongate control apertures 83.

The clutch disc 78 and the clutch segments 80 contained therein are surrounded at a small radial spacing by a peripheral clutch wall 81 which concentrically surrounds them and which is formed at an end flange 88 of the belt winding reel 12.

The precise design and arrangement of the individual components can be seen from the following functional description of the embodiments of FIGS. 13 and 14:

In normal operation the control pins 82 hold the clutch segments 80 at a small spacing from the clutch wall 81. In this way the teeth 91 remain out of engagement with the clutch wall 81 and the belt winding reel 12 can rotate unhindered by the clutch disc 78 or the torque generating device 18 in both directions. The inner shaft 41 which is connected to the retraction spring arrangement 14' (FIG. 1) extends through a bore in the drive reel 22 and the clutch disc 78 to the belt winding reel 12, with which it is rotationally fixedly connected.

In the case of a triggering of the pressure source, i.e. when the draw bands 21 are subjected to pressure, the drive reel 22 starts to rotate in the direction of the arrow D in FIGS. 13 and 14.

During this, the elongate control apertures 83 move in the circumferential direction, whereby the control pins 82 which remain stationary relative thereto slide along the elongate aperture and thereby pivot the clutch segments 80 in FIG. 14 about the axes 90 in the counterclockwise sense, whereby the radially outer toothed arrangement 91 moves radially outwardly and finally comes into engagement with the clutch wall 81 after a pivot angle of for example about 100. In this way, the belt winding reel 12 is now moved along in the belt winding direction. The toothed arrangement 91 is now located in a compressive coupling engagement with the clutch wall 81 which is continuously enhanced with increasing resistance to winding up of the belt.

The control pins 82 are sheared off on further rotation of the clutch disc 78 after the control movement. This does not however disturb the operation because after the first entry into engagement of the toothed arrangement 91 with the clutch wall 81 the further enhancement of the coupling engagement in the manner of a self-locking arrangement takes place automatically, so that the control pins 82 are then no longer required.

The clutch segments 80 are preferably lightly prestressed in the decoupling direction in such a way that the control pins 82 can admittedly deploy the clutch segments 80 without problem, but come out of engagement again with the clutch wall 81 after belt tensioning has taken place and after the torque generated by the torque generating device 18, so that the belt winding reel 12 is now again freely rotatable in both directions.

The resetting force provided at the clutch segments 80 can be generated by a resetting spring 95 which is for example merely indicated in FIG. 13 at only one clutch segment 80 at 95 and which acts between the clutch disc 78 and the respective clutch segment 80.

A further possibility for generating the resetting force lies in providing axial pins 96 on the segments at a distance from the pivot axis 90, with a spring ring 97 being arranged around the pins and exerting a radially inwardly directed resetting force on all the clutch segments 80. In FIG. 13, the spring ring 97 is only indicated in broken lines at one of the clutch segments 80 and the pin 96 which holds the spring ring 97 is only illustrated at the upper clutch segment 80 in FIG. 13.

What is claimed is:

1. A safety belt arrangement in motor vehicles having a belt tensioner comprising:

a holder to be secured to the vehicle chassis, with a belt winding reel with a safety belt wound thereon being rotatably mounted on the holder;

a belt retraction spring arrangement by means of which the safety belt is continuously lightly pretensioned in the drawing direction so that it only loosely lies against the vehicle occupant secured by it;

a fixing arrangement, in particular between the belt winding reel and the holder on the vehicle chassis, which, on suddenly pulling on the belt and/or with an accident-dependent acceleration, blocks the safety belt against being pulled out;

an auxiliary drive connected via a clutch to the belt winding reel, the auxiliary drive being normally separated drivewise by the disengaged clutch from the belt winding reel, but being activated abruptly with an accident-dependent acceleration and being rotationally fixedly coupled to the belt winding reel via the then engaged clutch in order to reel up the safety belt by a length such that the safety belt lies tightly against the vehicle occupant before the vehicle occupant secured by it falls into the safety belt;

with the auxiliary drive having:

a pressure source, in particular a pyrotechnical pressure source, which can be triggered or ignited with an accident-dependent response of an acceleration sensor and which, on being triggered, abruptly builds up a high pressure in a pressure space;

a torque generating device acted on by the pressure in the pressure space; and a drive shaft or a drive reel connected to the torque generating device which is rotationally fixed connected to the belt winding reel via the clutch, wherein the torque generating device has at least one flexible draw band, in particular consisting of spring steel, which is secured at the one end, at a first mounting point, to the circumference of the drive shaft, or to a drive reel concentrically mounted thereon, and is partially wound onto the drive shaft or onto the drive reel, and is secured at the other end, at a second mounting point, to the peripheral wall of a band running chamber disposed within a housing and arranged around the drive shaft or the drive reel with the housing including an end wall portion adjacent the belt reel, wherein the band running chamber has a width corresponding to the width of the draw band, in such a way that the draw band, which divides the band running chamber into two partial spaces sealed off from one another, extends through the band running chamber, wherein the partial space, which brings about an unwinding of the draw band from the rotating shaft or drive reel when subjected to pressure, is connected to the pressure space and the other partial space is vented, and wherein, for the decoupling of the partial spaces pressure-wise, at least one sealing wall is provided between the housing and the periphery of the drive shaft or of the drive reel concentrically mounted thereon, or the flexible draw band wound thereon, the drive shaft, or the drive reel, containing a hollow coupling space, the peripheral wall of which is formed as a rotary engagement surface and in which a rotary clutch member rotationally fixedly connected to the belt winding reel is concentrically arranged, with its peripheral wall being formed as a clutch engagement surface; and an intermediate space between the rotary engagement surface and the clutch engagement surface in which coupling elements which are normally out of engagement with the clutch engagement surface are arranged which produce a rotationally fixed coupling engagement between the rotary engagement surface and the clutch engagement surface when the drive shaft or the drive reel starts a rotary process in the event of triggering of the pressure source, wherein the coupling elements are coupling pins which are radially movably held, which extend axially into the intermediate space and which stand at least approximately in contact with the rotary engagement surface and also move radially inwardly against the clutch engagement surface on the start of their rotation in the case of a triggering of the pressure source and are clamped or latched between the rotary engagement surface and the clutch engagement surface in such a way that a rotationally fixed coupling engagement is present between the rotary engagement surface and the clutch engagement surface, and the coupling pins are releasable relative to their holder with a predetermined loading during a triggering, and in particular are designed to be sheared off, and the coupling pins are initially releasably mounted in the end region axially remote from the housing end wall portion in mounting recesses of a centering ring which is rotationally fixedly connected to the drive shaft, or to the drive reel, and are axially subsequently in peripheral engagement with fixed abutment surfaces of the housing in such a way that, on the start of rotation of the drive shaft, or of the drive reel, and on co-movement of the coupling pins caused thereby, the mounting of the coupling pins at the centering ring is released and the coupling pins come into an angular position relative to the centering ring where they are displaced radially inwardly towards the clutch engagement surface.

2. Safety belt arrangement in accordance with claim 1, wherein the mounting recess is at least partially closed at the side opposite to the direction of rotation of the centering ring by a holding/deviating nose which, at the start of rotation of the centering ring resiliently deflects or is sheared off and thus releases the coupling pins.

3. Safety belt arrangement in accordance with claim 1, wherein abutment surfaces project axially from a cover and a receiving space for the ends of the coupling pins is provided between abutment surfaces which follow one another in the peripheral direction.

4. Safety belt arrangement in accordance with claim 1, wherein approximately four to sixteen coupling pins are provided which are substantially uniformly distributed around the periphery.

5. Safety belt arrangement in accordance with claim 1, the clutch engagement surface is provided with axially extending teeth, and in that the coupling pins fit in form-locked manner into the tooth recesses.

6. A safety belt arrangement in motor vehicles having a belt tensioner comprising:

a holder to be secured to the vehicle chassis, with a belt winding reel with a safety belt wound thereon being rotatably mounted on the holder;

a belt retraction spring arrangement by means of which the safety belt is continuously lightly pretensioned in the draw-in direction so that it only loosely lies against the vehicle occupant secured by it;

a fixing arrangement, in particular between the belt winding reel and the holder on the vehicle chassis, which, on suddenly pulling on the belt and/or with an accident-dependent acceleration, blocks the safety belt against being pulled out;

an auxiliary drive connected via a clutch to the belt winding reel, the auxiliary drive being normally separated drivewise by the disengaged clutch from the belt winding reel, but being activated abruptly with an accident-dependent acceleration and being rotationally fixedly coupled to the belt winding reel via the then engaged clutch in order to reel up the safety belt by a length such that the safety belt lies tightly against the vehicle occupant before the vehicle occupant secured by it falls into the safety belt;

with the auxiliary drive having:
a pressure source, in particular a pyrotechnical pressure source, which can be triggered or ignited with an accident-dependent response of an acceleration sensor and which, on being triggered, abruptly builds up a high pressure in a pressure space;

a torque generating device acted on by the pressure in the pressure space; and a drive shaft or a drive reel connected to the torque generating device which is rotationally fixedly connected to the belt winding reel via the clutch, wherein the torque generating device has at least one flexible draw band, in particular consisting of spring steel, which is secured at the one end, at a first mounting point, to the circumference of the drive shaft, or to a drive reel concentrically mounted thereon and is partially wound onto the drive shaft or onto the drive reel, and is secured at the other end, at a second mounting point, to the peripheral wall of a band running chamber disposed within a housing and arranged around the drive shaft or the drive reel, wherein the band running chamber has a width corresponding to the width of the draw band, in such a way that the draw band, which divides the band running chamber into two partial spaces sealed off from one another, extends through the band running chamber, wherein the partial space, which brings about an unwinding of the draw band from the rotating drive shaft or drive reel when subjected to pressure, is connected to the pressure space and the other partial space is vented, and wherein, for the decoupling of the partial spaces pressure-wise, at least one sealing wall is provided between the housing and the periphery of the drive shaft or of the drive reel concentrically mounted thereon or the flexible draw band wound thereon, the drive shaft or the drive reel containing a hollow coupling cavity, the peripheral wall of which is formed as a rotary engagement surface and in which a rotatable clutch member rotatably fixedly connected to the belt winding reel is concentrically arranged, with the peripheral wall of the rotary clutch member being formed as a clutch engagement surface; and the drive shaft or the drive reel consists of a plurality of hollow sectors, two hollow sectors, which are normally diametrically spaced apart, but which, at the start of a rotation of the drive shaft or of the drive reel, move towards one another in the event of a triggering of the pressure source, with the rotary engagement surface and the clutch engagement surface coming into rotationally fixed coupling engagement.

7. Safety belt arrangement in accordance with claim 6, wherein the hollow sectors in particular are normally kept spaced apart by at least one spring which, however, at the start of a rotation of the drive shaft or the drive reel in the event of triggering of the pressure source, permits the approach of the hollow sectors which is necessary for the coupling engagement.

8. Safety belt arrangement in accordance with claim 7, wherein the spring is an open spring ring which acts from the radially inner side on the hollow sectors and is arranged in a peripheral groove in the inner wall of the hollow sectors in such a way that the spring ring does not prevent the entry into engagement of the rotary engagement surface with the clutch engagement surface.

9. Safety belt arrangement in accordance with claim 6, wherein the hollow sectors are normally pressed radially outwardly against a radial abutment surface fixed to the housing, by a spring, and are in this way held spaced apart; and cam surface pairs are provided between the hollow sectors and the housing which, in the rest position of the torque generating device, determine the position of the hollow sectors where they are out of the coupling engagement with a coupling member, but which, on relative rotation through a small angle, pushes the hollow sectors radially inwardly into coupling engagement with the rotary clutch member.

10. Safety belt arrangement in accordance with claim 9, wherein the cam surface pairs are formed by the flanks of teeth and recesses cooperating therewith which are provided around a recess provided at the housing and around an abutment ring arranged at the hollow sectors.

11. Safety belt arrangement in accordance with claim 9, wherein the cam surface pairs are provided at both end faces of the hollow sectors.

12. Safety belt arrangement in accordance with claim 11, wherein the springs are formed by elastic members arranged between the hollow sectors.

13. Safety belt arrangement in accordance with claim 6, wherein the angle through which the rotary clutch member must be turned until the coupling engagement between the drive shaft or the drive reel and the rotary clutch member is completed amounts to 5° to 20°, preferably 5° to 15°, and in particular to about 10°.

14. Clutch for a safety belt arrangement in motor vehicles for providing a rotationally fixed coupling between a drive shaft, or a drive reel, and a belt winding reel, wherein the drive shaft, or the drive reel, contains a hollow coupling space, the peripheral wall of which is formed as a rotary engagement surface and in which a rotary clutch member rotationally fixedly connected to the belt winding reel is concentrically arranged, with its peripheral wall being formed as a toothed clutch engagement surface, wherein an intermediate space is left between the rotary engagement surface and the clutch engagement surface in which coupling elements which are normally out of engagement with the clutch engagement surface are arranged, wherein the coupling elements are clutch pins having opposite ends and which are radially movably held, which extend axially into the intermediate space and which stand during coupling in contact with the rotary engagement surface and the clutch engagement surface, wherein the rotary engagement surface includes a cam surface and the clutch pins are radially inwardly movable against the clutch engagement surface due to the cam surface such that the clutch pins are first urged radially inwardly at one of their ends and then also on their other ends.

15. Clutch for a safety belt arrangement in motor vehicles for providing a rotationally fixed coupling between a drive shaft, or a drive reel, and a belt winding reel, wherein a clutch disc is rotationally fixedly connected to the drive shaft, or to the drive reel, said clutch disc being surrounded by a clutch wall which is rotationally fixedly connected to the belt winding reel, the clutch wall having a smooth interior surface facing the clutch disc and which is free of projections or teeth, wherein a plurality of toothed clutch segments are provided which are pivotable into coupling engagement with the smooth surface of the clutch wall for providing a compressive coupling engagement between the toothing of the clutch segments and the smooth surface of the coupling wall.

16. Clutch for a safety belt arrangement in motor vehicles for providing a rotationally fixed coupling between a drive shaft, or a drive reel, and a belt winding reel, wherein the drive shaft, or the drive reel, contains a hollow coupling space, the peripheral wall of which is formed as a rotary engagement surface and in which a rotary clutch member rotationally fixedly connected to the belt winding reel is concentrically arranged, with its peripheral wall being formed as a clutch engagement surface, wherein an intermediate space is left between the rotary engagement surface and the clutch engagement surface in which coupling elements which are normally out of engagement with the clutch engagement surface are arranged, wherein the coupling elements are clutch pins which are radially movably held, which extend axially into the intermediate space and which stand during coupling in contact with the rotary engagement surface and the clutch engagement surface, wherein a centering ring is provided which is rotationally fixedly connected to the drive shaft, or to the drive reel, said centering ring releasable mounting said clutch pins, and wherein said clutch pins are in engagement with fixed abutment surfaces after release in such a way that, on the start of rotation of the drive shaft, or of the drive reel, and on co-movement of the clutch pins caused thereby, the mounting of the clutch pins at the centering ring is released and the clutch pins come into an angular position relative to the centering ring for being displaced radially inwardly towards the clutch engagement surface.

17. Clutch for a safety belt arrangement in motor vehicles for providing a rotationally fixed coupling between a drive shaft, or a drive reel, and a belt winding reel, wherein the drive shaft, or the drive reel, contains a hollow coupling space, the peripheral wall of which is formed as a rotary engagement surface and in which a rotary clutch member rotationally fixedly connected to the belt winding reel is concentrically arranged, with its peripheral wall being formed as a clutch engagement surface, wherein an intermediate space is left between the rotary engagement surface and the clutch engagement surface in which coupling elements which are normally out of engagement with the clutch engagement surface are arranged, wherein the coupling elements are clutch pins which are radially movably held, which extend axially into the intermediate space and which stand during coupling in direct contact with the rotary engagement surface and the clutch engagement surface, and wherein holding means are provided for releasably securing an end of the clutch pins and adapted to shear the pins upon a rotational movement with the pins no longer being secured by the holding means and being clamped between the rotary and clutch engagement surfaces so that only single clutch pins are present at distinct locations between the engagement surfaces for providing a particularly defined control of the clutch pins.

* * * * *